US007127888B2

(12) United States Patent
Kajita et al.

(10) Patent No.: US 7,127,888 B2
(45) Date of Patent: Oct. 31, 2006

(54) HYDRAULIC DRIVE UNIT

(75) Inventors: Yusuke Kajita, Ushiku (JP); Kazunori Nakamura, Tsuchiura (JP); Toichi Hirata, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/520,144

(22) PCT Filed: Jul. 9, 2003

(86) PCT No.: PCT/JP03/08702

§ 371 (c)(1),
(2), (4) Date: Feb. 2, 2005

(87) PCT Pub. No.: WO2004/005727

PCT Pub. Date: Jan. 15, 2004

(65) Prior Publication Data

US 2005/0144938 A1 Jul. 7, 2005

(30) Foreign Application Priority Data

Jul. 9, 2002 (JP) ............................ 2002-200014

(51) Int. Cl.
*F16D 31/02* (2006.01)

(52) U.S. Cl. ............................ 60/424; 60/413; 91/452

(58) Field of Classification Search .................. 60/413, 60/414, 424; 91/DIG. 2, 444, 452, 511, 512
See application file for complete search history.

(56) References Cited

U.S. PATENT DOCUMENTS 5,323,687 A 6/1994 Zenker et al.
5,669,282 A * 9/1997 Tanino et al. ................. 91/520
5,797,310 A * 8/1998 Casey et al. .................. 60/424
6,389,953 B1 * 5/2002 Altman et al. ................ 91/515
6,898,932 B1 * 5/2005 Kajita ......................... 60/413
2003/0106423 A1 6/2003 Hajek, Jr. et al.

FOREIGN PATENT DOCUMENTS

| | | |
|---|---|---|
| DE | 1010951 | 1/2002 |
| EP | 1 186 783 A2 | 3/2002 |
| JP | 55-119838 | 9/1980 |
| JP | 60-179504 | 9/1985 |
| JP | 60-208610 | 10/1985 |
| JP | 02-147726 | 6/1990 |
| JP | 2002-031104 | 1/2002 |

* cited by examiner

*Primary Examiner*—Edward K. Look
*Assistant Examiner*—Michael Leslie
(74) *Attorney, Agent, or Firm*—Crowell & Moring LLP

(57) ABSTRACT

A hydraulic drive unit is provided with a boom cylinder, an arm cylinder, a communication line communicating a rod chamber of the boom cylinder and a bottom chamber of the arm cylinder with each other, and a switching valve arranged on the communication line for communicating or shutting off the communication line in accordance with a rod pressure of the boom cylinder. When an arm-crowding single operation is performed and by its digging counterforce, a rod pressure of the boom cylinder rises to a high pressure of at least a predetermined pressure, the switching valve is changed over from a shut-off position to a communicating position to feed pressure oil from the rod chamber to the bottom chamber. The boom cylinder is hence caused to automatically extend, thereby avoiding lifting of a hydraulic excavator body.

16 Claims, 8 Drawing Sheets

HYDRAULIC DRIVE UNIT

TECHNICAL FIELD

This invention relates to a hydraulic drive unit, which is arranged on a construction machine such as a hydraulic excavator and can perform a combined operation of plural hydraulic cylinders.

BACKGROUND ART

As a hydraulic drive unit arranged on a construction machine to perform a combined operation of plural hydraulic cylinders, the hydraulic drive unit disclosed in JP-A-2000-337307 is known, for example. This hydraulic drive unit is arranged on a hydraulic excavator. FIG. 4 is a hydraulic circuit diagram showing an essential construction of the hydraulic drive unit disclosed in JP-A-2000-337307, and FIG. 5 is a side view of the hydraulic excavator on which the hydraulic drive unit shown in FIG. 4 is arranged.

The hydraulic excavator shown in FIG. 5 is provided with a travel base 1, a revolving upperstructure 2 arrange on the travel base 1, a boom 3 mounted pivotally in a vertical direction on the revolving upperstructure 2, an arm 4 mounted pivotally in a vertical direction on the boom 3, and a bucket 5 mounted pivotally in a vertical direction on the arm 4. The boom 3, arm 4 and bucket 5 make up a front attachment. Also provided are a boom cylinder 6 for driving the boom 3, for example, as a first hydraulic cylinder; an arm cylinder 7 for driving the arm 4, for example, as a second hydraulic cylinder; and a bucket cylinder 8 for driving the bucket 5.

FIG. 4 illustrates the hydraulic drive unit arranged on the above-mentioned hydraulic excavator and provided with directional control valves of the center bypass type for driving the boom cylinder 6 and the arm cylinder 7, respectively, in the hydraulic drive unit.

As illustrated in FIG. 4, The boom cylinder 6 is provided with a bottom chamber 6*a* and a rod chamber 6*b*. When pressure oil is fed to the bottom chamber 6*a*, the boom cylinder 6 is caused to extend so that boom raising is performed. When pressure oil is fed to the rod chamber 6*b*, the boom cylinder 6 is caused to contract so that boom lowering is performed. The arm cylinder 7 is also provided with a bottom chamber 7*a* and a rod chamber 7*b*. When pressure oil is fed to the bottom chamber 7*a*, arm crowding is performed. When pressure oil is fed to the rod chamber 7*b*, arm dumping is performed.

The hydraulic drive unit, which includes the boom cylinder 6 and arm cylinder 7 as mentioned above, is provided with an engine 20, a main hydraulic pump 21 driven by the engine 20, a boom-controlling directional control valve 23 as a first directional control valve for controlling a flow of pressure oil to be fed from the main hydraulic pump 21 to the boom cylinder 6, an arm-controlling directional control valve 24 as a second directional control valve for controlling a flow of pressure oil to be fed from the main hydraulic pump 21 to the arm cylinder 7, a boom control device 25 as a first control device for performing remote switching control of the boom-controlling directional control valve 23, an arm control device 26 as a second control device for performing remote switching control of the arm-controlling directional control valve 24, and a pilot pump 22 driven by the engine 20.

The boom-controlling directional control valve 23 is arranged on a line 28 extending to a delivery line of the main hydraulic limp 21, whereas the arm-controlling directional control valve 24 is arranged on a line 27 extending to the above-mentioned delivery line.

The boom-controlling directional control valve 23 and the bottom chamber 6*a* of the boom cylinder 6 are connected with each other via a main line 29*a*, and the boom-controlling directional control valve 23 and the rod chamber 6*b* of the boom cylinder 6 are connected with each other via a main line 29*b*. Similarly, the arm-controlling directional control valve 24 and the bottom chamber 7*a* of the arm cylinder 7 are connected with each other via a main line 30*a*, and the arm-controlling directional control valve 24 and the rod chamber 7*b* of the arm cylinder 7 are connected with each other via a main line 30*b*.

The boom control device 25 is connected to the pilot pump 22. A pilot pressure produced responsive to a manipulation of the boom control device is fed via one of pilot lines 25*a*,25*b* to its corresponding control chamber of the boom-controlling directional control valve 23, and changes over the boom-controlling directional control valve 23 to a left position or right position in FIG. 4. Similarly, the arm control device 26 is connected to the pilot pump 22. A pilot pressure produced responsive to a manipulation of the arm control device is fed via one of pilot lines 26*a*,26*b* to its corresponding control chamber of the arm-controlling directional control valve 24, and changes over the arm-controlling directional control valve 24 to a left position or right position in FIG. 4.

In the hydraulic excavator provided with the hydraulic drive unit constructed as described above, the boom control device 25 shown in FIG. 4 is manipulated upon digging or otherwise handling earth or sand. As a result, a pilot pressure is produced, for example, in the pilot line 25*a* so that the boom-controlling directional control valve 23 is changed over to the left position in FIG. 4. As a consequence, the pressure oil delivered from the main hydraulic pump 21 is fed to the bottom chamber 6*a* of the boom cylinder 6 via the line 28, boom-controlling directional control valve 23 and main line 29*a*, and the pressure oil in the rod chamber 6*b* is caused to return to a reservoir 43 via the main line 29*b* and boom-controlling directional control valve 23. As a result, the boom cylinder 6 extends as indicated by an arrow 13 in FIG. 5 so that the boom 3 is caused to pivot as indicated by an arrow 12 in FIG. 5 and boom raising is hence performed.

Concurrently with the above boom-raising manipulation, the arm control device 26 is manipulated and hence, a pilot pressure is produced, for example, in the pilot line 26*a* so that the arm-controlling directional control valve 24 is changed over to the left position in FIG. 4. As a consequence, the pressure oil delivered from the main hydraulic pump 21 is fed to the bottom chamber 7*a* of the arm cylinder 7 via the line 27, arm-controlling directional control valve 24 and main line 30*a*, and the pressure oil in the rod chamber 7*b* is caused to return to the reservoir 43 via the main line 30*b* and arm-controlling directional control valve 24. As a result, the arm cylinder 7 is caused to extend as indicated by an arrow 9 in FIG. 5 so that the arm 4 is caused to pivot as indicated by an arrow 11 in FIG. 5 and an arm-crowding operation is hence performed.

In addition to such boom-raising and arm-crowding operations as mentioned above, an unillustrated bucket control device is also manipulated to change over a bucket-controlling directional control valve such that the bucket cylinder 8 shown in FIG. 5 is caused to extend in the direction of an arrow 10 in FIG. 5. As a result, the bucket 5 is caused to pivot in the direction of the arrow 11 such that the desired digging or like work of earth or sand is performed.

FIG. 6 shows characteristic diagrams of pilot pressure characteristics and cylinder pressure characteristics in the above-mentioned combined operation. In the lower diagram in FIG. 6, times of digging work are plotted along the abscissa whereas pilot pressures produced by the control device are plotted along the ordinate. Designated at numeral 31 in the lower diagram in FIG. 6 are pilot pressures produced by the arm control device 26 shown in FIG. 4 and to be fed to the pilot line 26*a*, in other words, pilot pressures upon crowding the arm whereas indicated at numeral 32 in the lower diagram in FIG. 6 are pilot pressure produced by the boom control device 25 shown in FIG. 4 and to be fed to the pilot line 25*a*, in other words, pilot pressures upon raising the boom. Signs T1, T2 and T3 indicate time points at which boom-raising operations were performed.

In the upper diagram in FIG. 6, times of digging work are plotted along the abscissa whereas load pressures produced in hydraulic cylinders 6,7, in other words, cylinder pressures are plotted along the ordinate. Designated at numeral 33 in the upper diagram in FIG. 6 are bottom pressures produced in the bottom chamber 7*a* of the arm cylinder 7, in other words, arm cylinder bottom pressures whereas indicated at numeral 34 are rod pressures produced in the rod chamber 6*b* of the boom cylinder 6, in other words, boom cylinder rod pressures. When such a combined, boom-raising and arm-crowding operation is performed, a force in the direction of the arrow 12 in FIG. 5 is transmitted to the boom 3 by a counterforce occurred upon digging earth or sand by the bucket 5. Accordingly, the boom cylinder 6 tends to be pulled in the direction of the arrow 13 in FIG. 5, and as a consequence, a high pressure is produced in the rod chamber 6*b* of the boom cylinder 6 as indicated by the boom rod pressure 34 in the upper diagram in FIG. 6.

In the above-mentioned conventional technology, the digging or like work of earth or sand can be performed without an inconvenience or problem through a combined, boom-raising and arm-crowding operation. When the digging of earth or sand is performed, for example, by an arm-crowding single operation, however, an inconvenience or problem may arise as will be described next.

Specifically, when an arm-crowding single operation is performed where the ground is very hard or under such a situation that a large rock exists in the earth, the pressure in the bottom chamber 7*a* of the arm cylinder 7 becomes very high. As the boom 3 is pivotally connected to the revolving upperstructure 2, on the other hand, a digging counterforce by the arm 4 is applied in the direction indicated by the arrow 12 in FIG. 5 so that a tensile force is applied in the direction of the arrow 13 to the boom cylinder 6. In this state, the boom-controlling directional control valve 23 is in such a position as closing the circuit. The pressure oil in the rod chamber 6*b* of the boom cylinder 6, therefore, has no place to which it can drain back, so that the pressure becomes very high. In other words, despite the single arm-crowding operation, the pressure in the rod chamber 6 of the boom cylinder 6 becomes very high, so that a digging counterforce by the arm 4 may not be fully supported by the boom cylinder 6 and the body of the hydraulic excavator may be lifted as illustrated in FIG. 7. Such a situation is unpleasant for the operator, and may become a cause of a reduction in the efficiency of work.

To such a problem, a hydraulic circuit has been proposed in which as illustrated in FIG. 8, for example, a line is arranged to connect the rod chamber 6*b* of the boom cylinder 6 as the first hydraulic cylinder and the reservoir 43 with each other and an overload relief valve 80 is arranged on the line to release the pressure oil to the reservoir 43 when the pressure rises to at least a predetermined pressure. Such a circuit is, however, extremely disadvantageous from the standpoint of energy efficiency because a great deal of heat is produced in the hydraulic circuit upon occurrence of a situation that the overload relief valve 80 continues to release.

With the above-mentioned circumstances of the conventional technologies in view, the present invention has as an object the provision of a hydraulic drive unit which, upon performing an operation that pressure oil is fed to the bottom chamber of the second hydraulic cylinder, an excessive pressure can be released from the rod chamber of the first cylinder and the pressure oil in the rod chamber can be effectively used.

DISCLOSURE OF THE INVENTION

To achieve the above-described object, the present invention provides a hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from the main hydraulic pump to the first hydraulic cylinder, a second directional control valve for controlling a flow of pressure oil to be fed from the main hydraulic pump to the second hydraulic cylinder, a first control device for performing switching control of the first directional control valve, and a second control device for performing switching control of the second directional control valve, characterized in that the hydraulic drive unit is provided with communication control means for bringing the rod compartment of the first hydraulic cylinder and the bottom compartment of the second hydraulic cylinder into communication with each other when a pressure in the rod chamber of the first hydraulic cylinder has arisen to a high pressure of at least a predetermined pressure.

According to the present invention constructed as described above, when the pressure in the rod chamber of the first hydraulic cylinder has arisen to a high pressure of at least the predetermined pressure by a counterforce as a result of a drive of the second hydraulic cylinder during the performance of a single operation of the second hydraulic cylinder by manipulating the second control device to change over the second directional control valve and feeding the pressure oil from the main hydraulic pump to the bottom chamber of the second hydraulic cylinder via the second directional control valve, the communication control means is actuated to feed the pressure oil from the rod chamber of the first hydraulic cylinder to the bottom chamber of the second hydraulic cylinder. In other words, the pressure oil delivered from the main hydraulic pump and fed via the second directional control valve and the pressure oil fed from the rod chamber of the first hydraulic cylinder are fed in combination to the bottom chamber of the second hydraulic cylinder. As a consequence, the pressure in the rod chamber of the first hydraulic cylinder is controlled at a pressure approximately equal to the pressure in the bottom chamber of the second hydraulic cylinder, and in addition, an acceleration of the second hydraulic cylinder in an extending direction can be performed. As described above, it is possible to prevent the pressure in the rod chamber of the first hydraulic cylinder from increasing excessively. It is also possible to effectively use the pressure oil in the rod chamber of the first hydraulic cylinder for the selective acceleration of the second hydraulic cylinder although the pressure oil has heretofore been released and drained to the reservoir.

The present invention can also be constructed such that in the above-described invention, the communication control means may be constructed to comprise a communication line capable of bringing the rod chamber of the first hydraulic cylinder and the bottom chamber of the second hydraulic cylinder into communication with each other, reverse-flow prevention means arranged on the communication line for inhibiting pressure oil from flowing from the bottom chamber of the second hydraulic cylinder toward the rod chamber of the first hydraulic cylinder, and a switching valve for shutting off the communication line when the pressure in the rod chamber of the first hydraulic cylinder is lower than the predetermined pressure but maintaining the communication line in a communicating state when the pressure in the rod chamber of the first hydraulic cylinder has arisen to at least the predetermined pressure.

According to the present invention constructed as described above, when the pressure in the rod chamber of the first hydraulic cylinder has arisen to a high pressure of at least the predetermined pressure by a counterforce as a result of a drive of the second hydraulic cylinder during the performance of a single operation of the second hydraulic cylinder by feeding the pressure oil from the main hydraulic pump to the bottom chamber of the second hydraulic cylinder, the switching valve is changed to over to maintain the communication line in a communicating state. As a result, the pressure oil is fed from the rod chamber of the first hydraulic cylinder to the bottom chamber of the second hydraulic cylinder via the communication line and the reverse-flow prevention means. In other words, the pressure oil fed via the second directional control valve and the pressure oil fed from the rod chamber of the first hydraulic cylinder are fed in combination to the bottom chamber of the second hydraulic cylinder. As a consequence, the pressure in the rod chamber of the first hydraulic cylinder is controlled at a pressure approximately equal to the pressure in the bottom chamber of the second hydraulic cylinder, and in addition, an acceleration of the second hydraulic cylinder in an extending direction can be realized.

The present invention can also be constructed such that in the above-described invention, the switching valve includes a variable restriction element a degree of restriction of which varies in accordance with the pressure in the rod chamber of the hydraulic cylinder.

Owing to this construction, the amount of the pressure oil to be fed from the rod chamber of the first hydraulic cylinder to the bottom chamber of the second hydraulic cylinder is restricted in accordance with the pressure in the rod chamber of the first hydraulic cylinder, thereby making it possible to reduce a shock especially when the switching valve is changed over from the shut-off state to the communicating state.

The present invention can also be constructed such that in the above-described invention, variable restriction means, a degree of restriction of which varies in accordance with an amount of a manipulation of the second control device, is arranged on the communication line via which the bottom chamber of the second hydraulic cylinder and the reverse-flow prevention means are connected with each other.

In the present invention constructed as described above, the amount of the pressure oil to be fed from the side of the first hydraulic cylinder to the side of the second hydraulic cylinder is restricted even when by a counterforce as a result of a drive of the second hydraulic cylinder, the pressure in the rod chamber of the first hydraulic cylinder becomes high and the switching valve is brought into the communicating state, because the degree of restriction of the variable restrictor is determined in accordance with the amount of a manipulation of the second control device. It is, therefore, possible to control an extreme acceleration of the second hydraulic cylinder whenever the extreme acceleration is not intended by the operator.

The present invention can also be constructed such that in the above-described invention, there are also arranged a solenoid valve for producing a pilot hydraulic pressure signal to control a valve position of the switching valve, pressure detection means for detecting the pressure in the rod chamber of the first hydraulic cylinder, manipulation amount detection means for detecting an amount of a manipulation of the second control device, and a controller for being inputted with a pressure signal from the pressure detection means and a control signal from the manipulation amount detection means, performing predetermined processing, and outputting a drive signal to the solenoid valve.

By the present invention constructed as described above, it is also possible to reduce a shock which occurs at the time of an extreme acceleration of the second hydraulic cylinder or a change-over of the switching valve.

The present invention can also be characterized in that in the above-described invention, the construction machine is a hydraulic excavator having a revolving upperstructure, a boom pivotally mounted on the revolving upperstructure and an arm pivotally mounted on the boom, the first hydraulic cylinder is a boom cylinder for driving the boom, the second hydraulic cylinder is an arm cylinder for driving the arm, and the hydraulic drive unit further comprises communication control means for bringing a rod chamber of the boom cylinder and a bottom chamber of the arm cylinder into communication with each other when a pressure in the rod chamber of the boom cylinder has arisen to the high pressure of at least the predetermined pressure.

According to the present invention constructed as described above, the communication control means is actuated when the pressure in the rod chamber of the boom cylinder has arisen to a high pressure of at least the predetermined pressure by a digging counterforce while an arm-crowding operation is being performed. As a result, the pressure oil is fed from the rod chamber of the boom cylinder to the bottom chamber of the arm cylinder. In other words, the pressure oil delivered from the main hydraulic pump and fed via the arm-controlling directional control valve and the pressure oil fed from the rod chamber of the boom cylinder are fed in combination to the bottom chamber of the arm cylinder. As a result, an acceleration of the arm cylinder in the extending direction, that is, an acceleration of the arm crowding can be realized. As the pressure oil is discharged from the rod chamber of the boom cylinder, it is also possible to prevent the pressure from extremely increasing in the rod chamber of the boom cylinder. Moreover, the body of the hydraulic excavator can be prevented from being lifted as a result of an automatic extension of the boom cylinder.

The present invention can also be characterized in that in the above-described invention, the construction machine is a hydraulic excavator having a revolving upperstructure, a boom pivotally mounted on the revolving upperstructure, an arm pivotally mounted on the boom and a bucket pivotally mounted on the arm, the first hydraulic cylinder is a boom cylinder for driving the boom, the second hydraulic cylinder is a bucket cylinder for driving the bucket, and the hydraulic drive unit further comprises communication control means for bringing a rod chamber of the boom cylinder and a bottom chamber of the bucket cylinder into communication with each other when a pressure in the rod chamber of the boom cylinder has arisen to the high pressure of at least the predetermined pressure.

According to the present invention constructed as described above, the communication control means is actuated when the pressure in the rod chamber of the boom cylinder has arisen to a high pressure of at least the predetermined pressure by a digging counterforce while an arm-crowding operation is being performed by the bucket. As a result, the pressure oil is fed from the rod chamber of the boom cylinder to the bottom chamber of the bucket cylinder. In other words, the pressure oil delivered from the main hydraulic pump and fed via the bucket-controlling directional control valve and the pressure oil fed from the rod chamber of the boom cylinder are fed in combination to the bottom chamber of the bucket cylinder. As a result, an acceleration of the bucket cylinder in the extending direction can be realized. It is also possible to prevent the pressure from extremely increasing in the rod chamber of the boom cylinder.

BEST MODES FOR CARRYING OUT THE INVENTION

The embodiments of the hydraulic drive unit according to the present invention will hereinafter be described based on the drawings.

Figure 1:
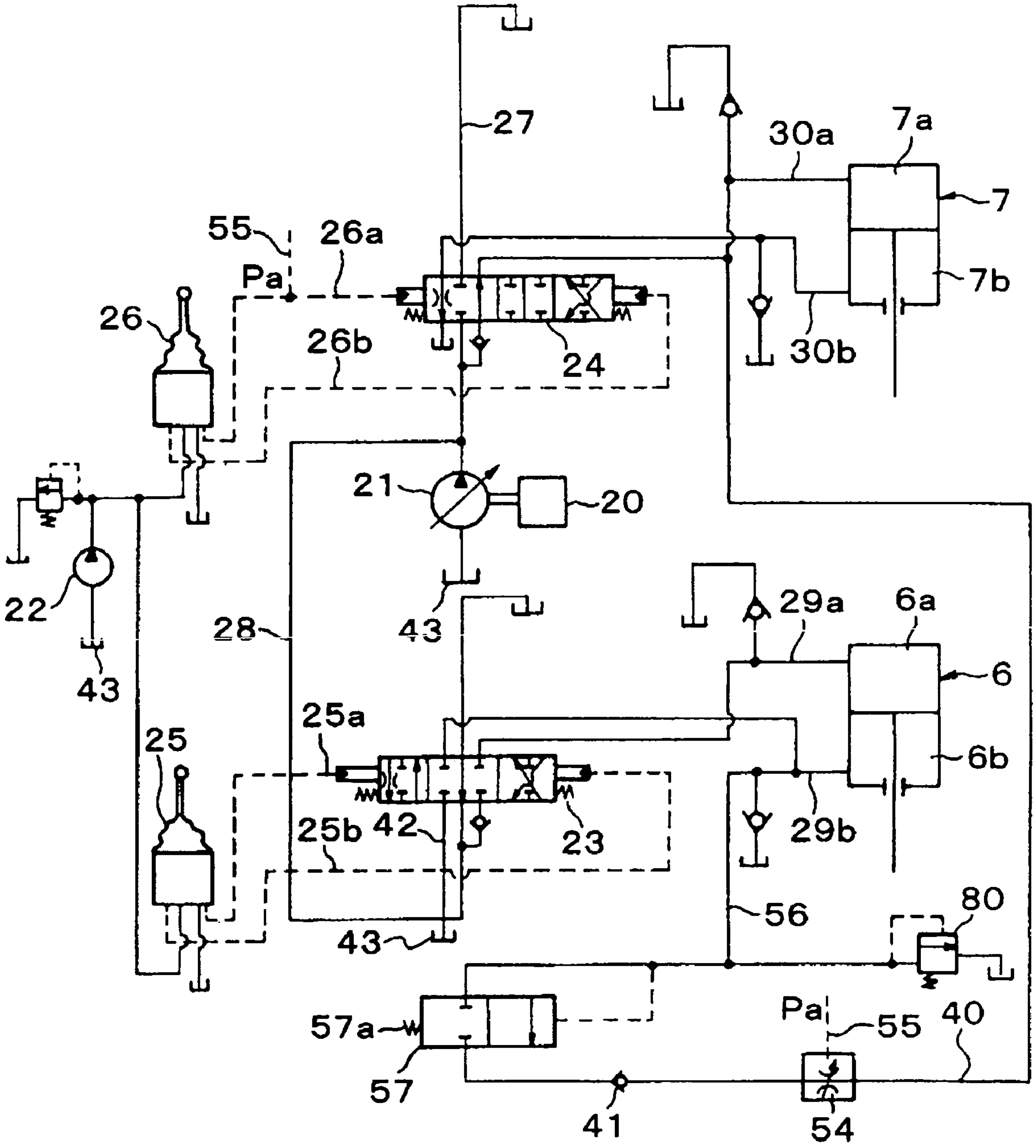
FIG. 1 is a hydraulic circuit diagram showing a first embodiment of the hydraulic drive unit according to the present invention.

FIG. 1 is a circuit diagram illustrating the first embodiment of the hydraulic drive unit according to the present invention.

Figure 4:
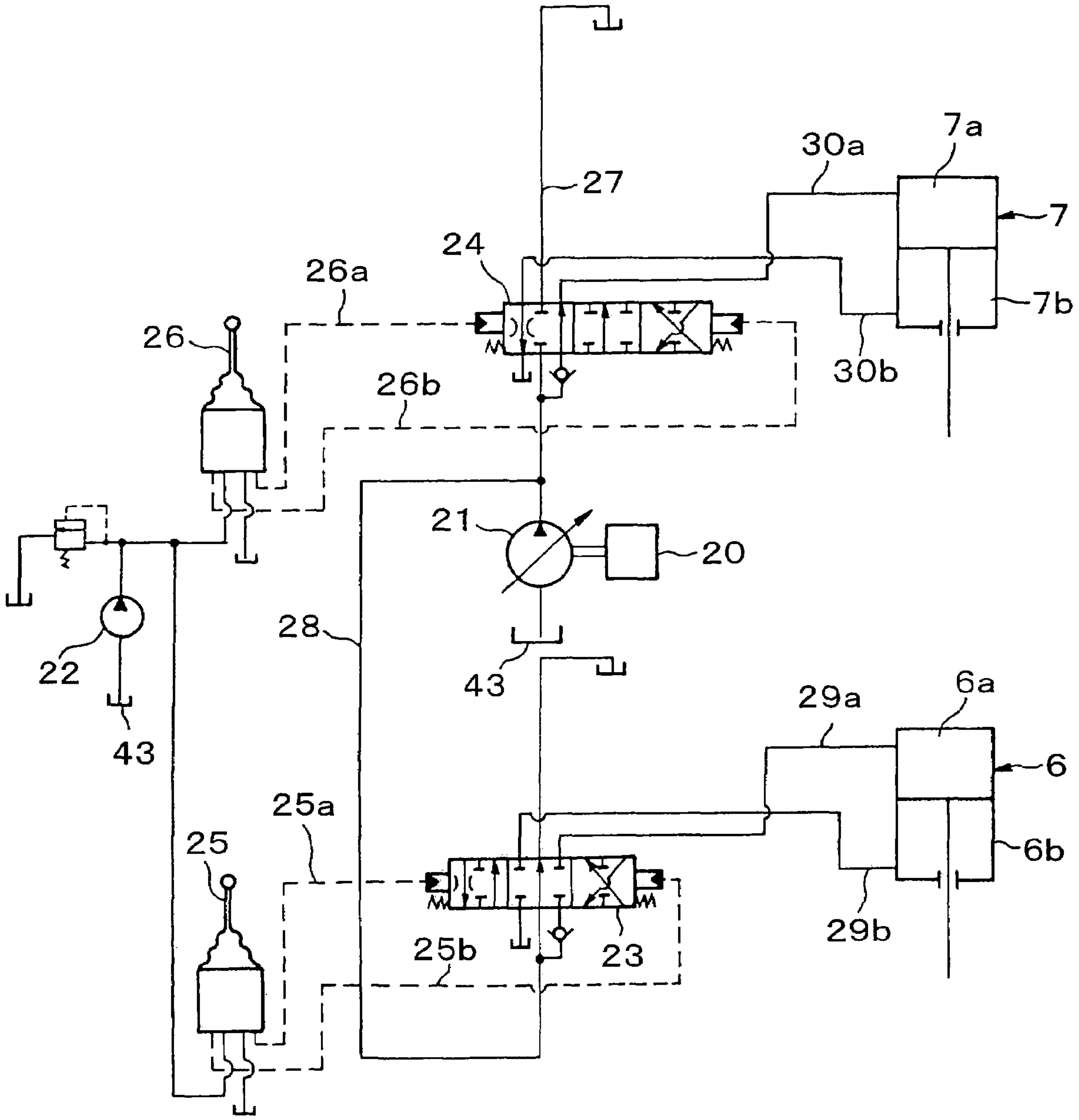
FIG. 4 PRIOR ART
FIG. 4 is a hydraulic circuit diagram showing a conventional hydraulic drive unit.
Figure 8:
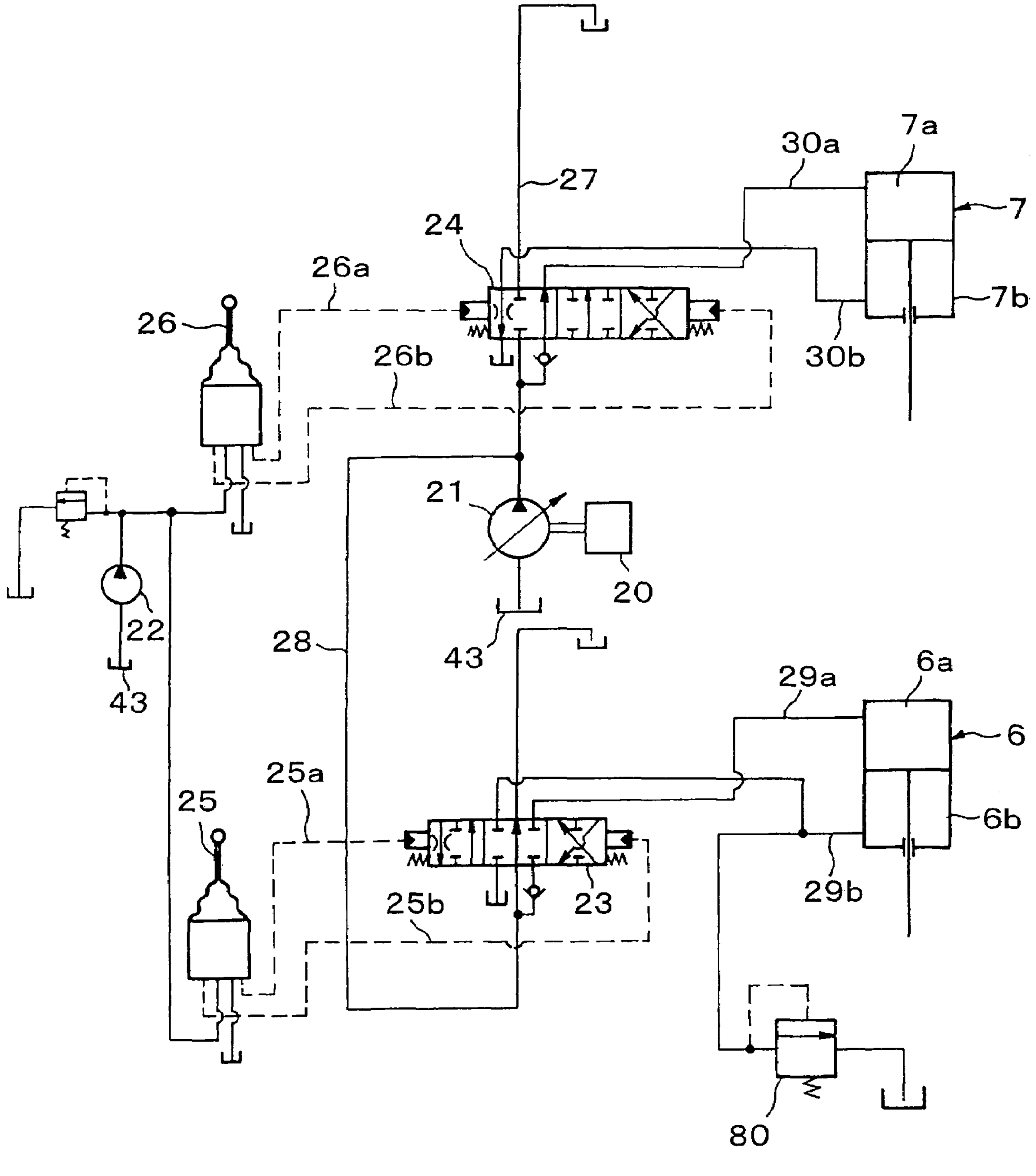
FIG. 8 PRIOR ART
FIG. 8 is a hydraulic circuit diagram depicting a hydraulic drive unit according to another conventional technology.

In FIG. 1, those parts of the hydraulic drive unit which are equivalent to corresponding parts in those illustrated in FIGS. 4 and 8 are shown by the same reference numerals. It is also to be noted that the first embodiment shown in FIG. 1 and the second embodiment, which will be described subsequently herein, are both arranged on construction machines, for example, the above-mentioned hydraulic excavator depicted in FIG. 5. Accordingly, descriptions will hereinafter be made by using the reference numerals shown in FIG. 5 as needed.

The first embodiment shown in FIG. 1 is also constructed of a hydraulic drive unit, which is provided with directional control valves of the center bypass type for driving, for example, a boom cylinder 6 as a first hydraulic cylinder and an arm cylinder 7 as a second hydraulic cylinder, respectively. Although the description of FIG. 4 will be repeated, the first embodiment shown in FIG. 1 is also constructed such that the boom cylinder 6 is provided with a bottom chamber 6*a* and a rod chamber 6*b* and the arm cylinder 7 is provided with a bottom chamber 7*a* and a rod chamber 7*b*.

The first embodiment is also provided with an engine 20, a main hydraulic pump 21 and pilot pump 22 driven by the engine 20, a first directional control valve for controlling a flow of pressure oil to be fed to the boom cylinder 6, i.e., a boom-controlling directional control valve 23 of the center bypass type and a second directional control valve for controlling a flow of pressure oil to be fed to the arm cylinder 7, i.e., an arm-controlling directional control valve 24 of the center bypass type. Also provided are a first control device for performing remote switching control of the boom-controlling directional control valve 23, i.e., a boom control device 25 and a second control device for performing remote switching control of the arm-controlling directional control valve 24, i.e., an arm control device 26.

Lines 27,28 are connected a delivery line of the main hydraulic pump 21, the arm-controlling directional control valve 24 is arranged on the line 27, and the boom-controlling direction control valve 23 is arranged on the line 28.

The boom-controlling directional control valve 23 and the bottom chamber 6*a* of the boom cylinder 6 are connected with each other via a main line 29*a*, and the boom-controlling directional control valve 23 and the rod chamber 6*b* of the boom cylinder 6 are connected with each other via a main line 29*b*. The arm-controlling directional control valve 24 and the bottom chamber 7*a* of the arm cylinder 7 are connected with each other via a main line 30*a*, and the arm-controlling directional control valve 24 and the rod chamber 7*b* of the arm cylinder 7 are connected with each other via a main line 30*b*.

The boom control device 25 and arm control device 26 are constructed, for example, of pilot control devices which produce pilot pressures, respectively, and are connected to the pilot pump 22. Further, the boom control device 25 is connected to control chambers of the boom-controlling directional control valve 23 via pilot lines 25*a*,25*b*, respectively, and the arm control device 26 is connected to control chambers of the arm-controlling directional control valve 24 via pilot lines 26*a*,26*b*, respectively.

The above-described construction is equivalent to the above-mentioned, corresponding construction illustrated in FIG. 4.

Described specifically, the first embodiment is provided with communication control means for bringing the rod chamber 6*b* of the boom cylinder 6, which constitutes the first hydraulic cylinder, into communication with the bottom chamber 7*a* of the arm cylinder 7, which constitutes the second hydraulic cylinder, especially when the pressure in the rod chamber 6*b* of the boom cylinder 6 has arisen to a high pressure of at least the predetermined pressure while the arm 4 is being operated in the digging direction, in other words, an arm-crowding operation is being performed.

This communication control means includes, as shown by way of example in FIG. 1, a communication line 40 capable of communicating the rod chamber 6*b* of the boom cylinder 6 and the bottom chamber 7*a* of the arm cylinder 7 with each other; and a switching valve 57 for shutting off the communication line 40 when the pressure in the rod chamber 6*b* of the boom cylinder 6 is lower than the predetermined pressure but maintaining the communication line 40 in a communicating state when the pressure in the rod chamber

6*b* of the boom cylinder has risen to a high pressure of at least the predetermined pressure. The communication control means also includes reverse-flow prevention means for preventing the pressure oil from flowing from the bottom chamber 7*a* of the arm cylinder 7 toward the rod chamber 6*b* of the boom cylinder 6, for example, a check valve 41; and variable restriction means an opening area of which is controlled in accordance with the amount of a manipulation of the arm control device 26 when an arm-crowding operation is performed by the arm control device 26, for example, a variable restrictor 54. The switching valve 57 is a pilot-operated switching valve which is changed over by the pressure in the rod chamber 6*b* of the boom cylinder 6, and to the variable restrictor 54, a pilot pressure is applied from the pilot line 26 of the arm control device 26 via a control line 55.

As in FIG. 8 illustrating the above-mentioned conventional technology, an overload relief valve 80 is arranged on a ling 56 via which the rod chamber 6*b* of the boom cylinder 6 and the reservoir 43 are connected with each other. A preset pressure, which is determined by a spring 57*a* for changing over the switching valve 57 from the shut-off position to the communicating position, is set lower than a preset pressure of the overload relief valve 80.

The procedure of an arm-crowding single operation performed by the first embodiment constructed as described above is as will be described next.

When the arm control device 26 is manipulated, a pilot pressure is fed to the pilot line 26*a* and the arm-controlling directional control valve 24 is changed over to the left position, the pressure oil delivered from the main hydraulic pump 21 is fed to the bottom chamber 7*a* of the arm cylinder 7 via the line 27, arm-controlling directional control valve 24 and main line 30*a*. As a result, the arm cylinder 7 operates in the extending direction so that the arm 4 shown in FIG. 5 is caused to pivot in the direction of the arrow 11 and an arm-crowding operation is performed.

On the other hand, no pilot pressure is fed to the pilot line 25*a* or 25*b* of the boom-operating system. Therefore, the boom-operating system remains under the reservoir pressure and the boom-controlling directional control valve 23 retains the neutral position.

To the variable restrictor 54 arranged on the communication line 40, a pilot pressure Pa is applied from the pilot line 26*a* via the control line 55, so that the variable restrictor 54 is in a state opened with an area corresponding to this pilot pressure Pa. When the pressure in the rod chamber 6*b* of the boom cylinder 6 is lower than a predetermined pressure, specifically the above-mentioned pressure preset by the spring 57*a*, on the other hand, a force produced by a control pressure applied to a control chamber of the switching valve 56 is smaller than the spring force of the spring 57*a* so that the switching valve 57 is held in the left position shown in FIG. 1. In this state, the rod chamber 6*b* of the boom cylinder 6 is in a completely blocked state so that during an extending operation of the arm cylinder 7, the pressure oil is not fed from the rod chamber 6*b* of the boom cylinder 6 to the communication line 40.

Figure 5:
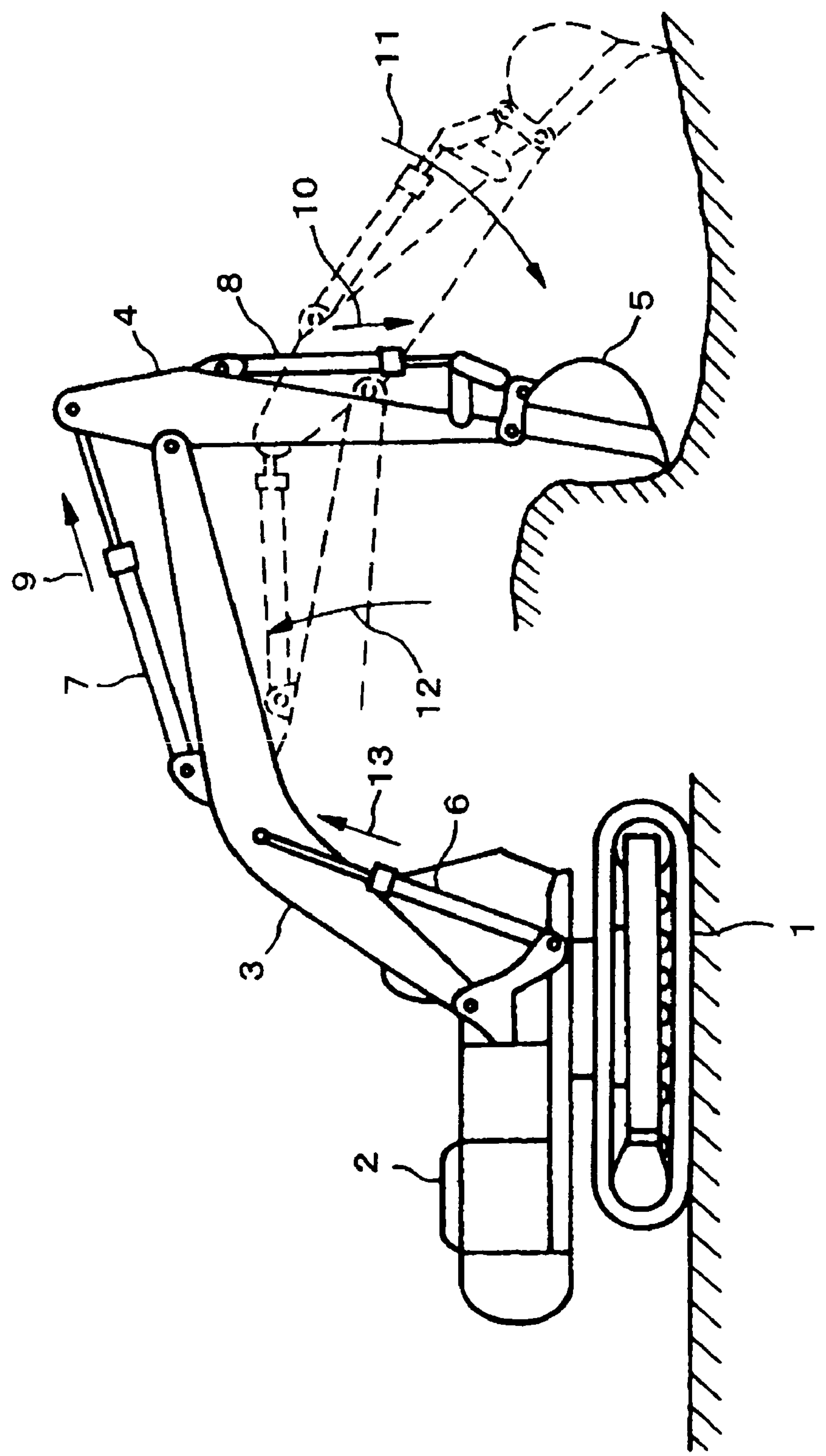
FIG. 5 is a side view of a hydraulic excavator illustrated as an example of a construction machine on which the hydraulic drive unit shown in FIG. 4 is arranged.
Figure 6:
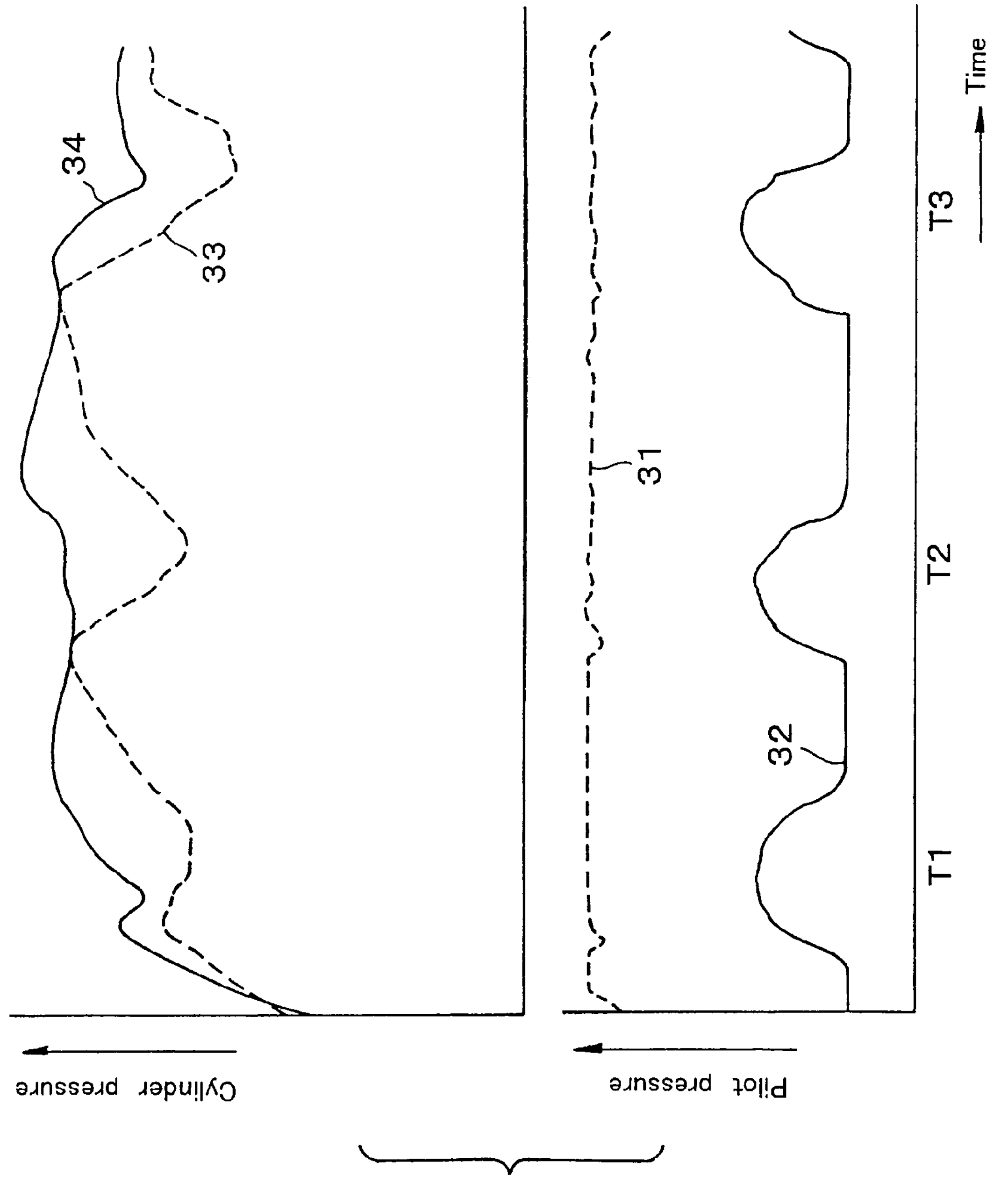
FIG. 6 PRIOR ART
FIG. 6 shows characteristic diagrams illustrating pilot pressure characteristics and cylinder pressure characteristics in the conventional hydraulic drive unit.
Figure 7:
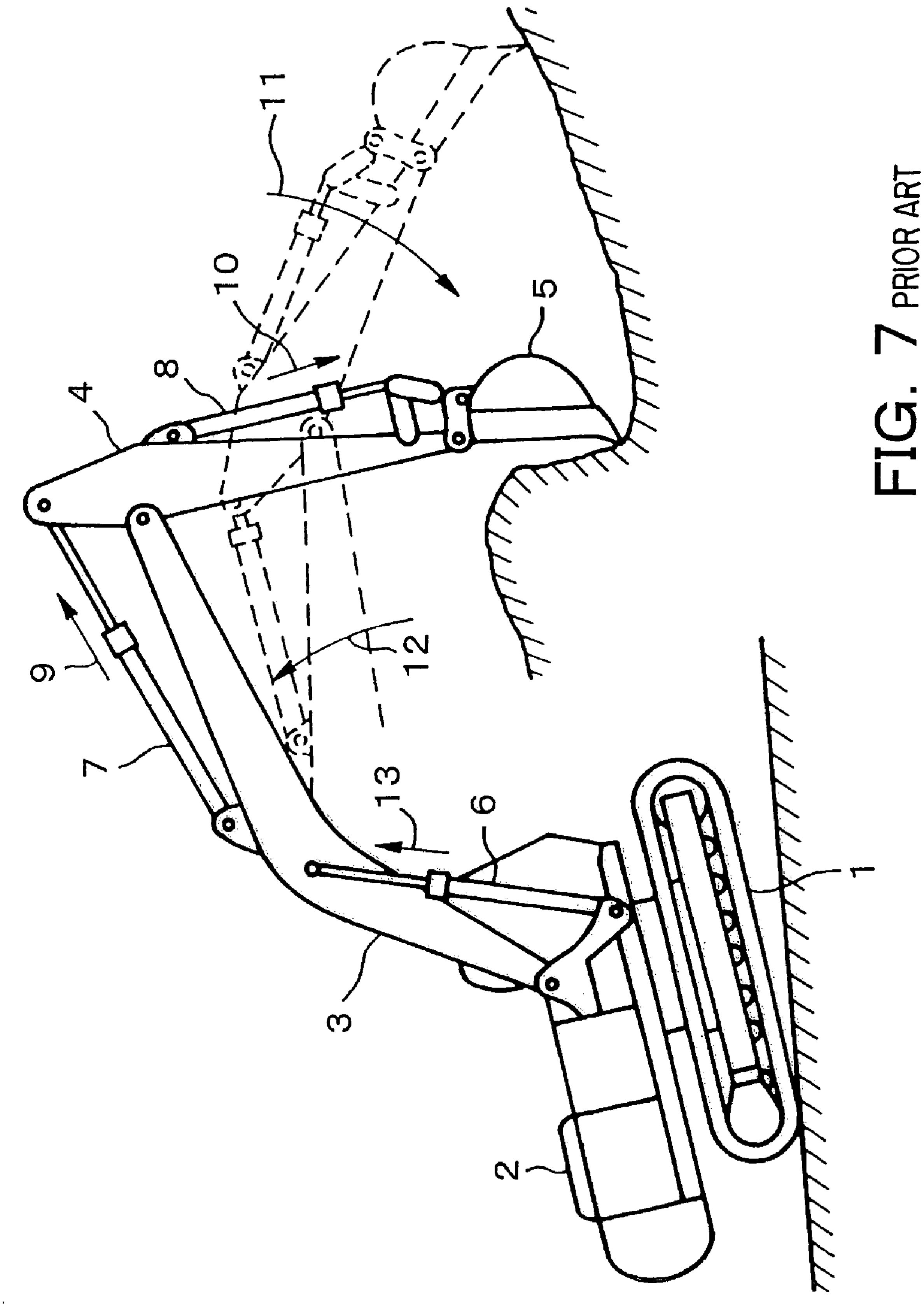
FIG. 7 PRIOR ART
FIG. 7 is a view illustrating a problem or inconvenience in the conventional technology.

When a turning force is applied in this state to the boom 3 under a counterforce of digging by the arm 4 as indicated by the arrow 12 in FIG. 5, the boom cylinder 6 is pulled in the direction indicated by the arrow 13. When the pressure in the rod chamber 6*b* of the boom cylinder 6 has arisen to a high-pressure of at least the predetermined pressure by the pulling force, a force produced by a control pressure applied to a control chamber of the switching valve 57 becomes greater than the spring force of the spring 57*a* so that the switching valve 57 is changed over to the right position shown in FIG. 1. As soon as this state is established, the pressure oil is fed from the rod chamber 6*b* of the boom cylinder 6 to the communication line 40 via the switching valve 57, check valve 41 and variable restrictor 54. The pressure oil fed to the communication line 40 is fed to the bottom chamber 7*a* of the arm cylinder 7 via the main line 30*a*. In other words, the pressure oil delivered from the main hydraulic pump 21 and fed via the arm-controlling directional control valve 24 and the pressure oil fed from the rod chamber 6*b* of the boom cylinder 6 are fed in combination to the bottom chamber 7*a* of the arm cylinder 7. At this time, oil is replenished from the reservoir 43 to the bottom chamber 6*a* of the boom cylinder 6 via the check valve and main line 29*a*. The interior of the bottom chamber 6*a* is, therefore, prevented from falling in a negative pressure state.

As described above, when the pressure in the rod chamber 6*b* of the boom cylinder 6 has become higher than the predetermined pressure at the time of an arm-crowding single operation in the first embodiment, the pressure oil can be fed from the rod chamber 6*b* of the boom cylinder 6 to the bottom chamber 7*a* of the arm cylinder 7 to cause the boom cylinder 6 to extend. It is, therefore, possible to release a digging counterforce by an arm-crowding operation and hence to prevent lifting of the body. As the pressure oil flowed out of the rod chamber 6*b* of the boom cylinder 6 is fed to the bottom chamber 7*a* of the arm cylinder 7, it is also possible to realize an acceleration of the arm cylinder 6 in the extending direction and to make faster the speed of an arm-crowding operation.

When a combined operation of boom raising and arm crowding is performed, on the other hand, the boom-controlling directional control valve 23 moves from the valve position shown in FIG. 1 to the valve position on the left side, the rod chamber 6*b* of the boom cylinder 6 and the reservoir 43 are brought into communication with each other, and the pressure oil is returned from the rod chamber 6*b* to the tank 43. If the pressure in the rod chamber 6*b* of the boom cylinder 6 becomes higher than the predetermined pressure for some reason or other and the switching valve 57 is brought into the communicating state, the pressure oil is fed from the rod chamber 6*b* of the boom cylinder 6 to the bottom chamber 7*a* of the arm cylinder 7 so that the speed of the arm cylinder 6 in the extending direction is accelerated.

When a combined operation of boom lowering and arm crowding is performed, the bottom chamber 6*a* of the boom cylinder 6 is brought into communication with the reservoir 43 via the boom-controlling directional control valve 23. When the pressure in the rod chamber 6*b* of the boom cylinder 6 becomes higher than the predetermined pressure at this time and the switching valve 57 is brought into the communicating state, the digging force by the boom 3 decreases than those available from the conventional technologies but the digging force by the arm 4 increases correspondingly. As a consequence, the digging force becomes substantially equal to those available from the conventional technologies.

When a combined operation of an arm-dumping operation and the boom 3 or an arm-dumping single operation is performed, the variable restrictor 54 remains closed because the pilot pressure Pa is not applied to the variable restrictor 54. The operation is, therefore, similar to the corresponding operations by the conventional technologies.

As described above, when the pressure in the rod chamber 6*b* of the boom cylinder 6 has become higher than the predetermined pressure by a digging counterforce at the time of an arm-crowding single operation in the first embodiment, the pressure oil can be fed from the rod chamber 6*b* of the boom cylinder 6 to the bottom chamber 7*a* of the arm cylinder 7 to cause the boom cylinder 6 to extend. It is, therefore, possible to release a digging counterforce by an arm-crowding operation and hence to prevent lifting of the body. As the pressure oil flowed out of the rod chamber 6*b* of the boom cylinder 6 is fed to the bottom chamber 7*a* of the arm cylinder 7, it is also possible to realize an acceleration of the arm cylinder 6 in the extending direction and to make faster the speed of an arm-crowding operation. As can be appreciated from the foregoing, the pressure oil in the rod chamber 6*b* of the boom cylinder 6 can be effectively used although it has heretofore been drained simply to the reservoir. Further, the degree of restriction of the variable restrictor 54 is controlled in accordance with the amount of an arm-dumping manipulation of the arm control device 26. It is, therefore, possible to control an extreme acceleration of the second hydraulic cylinder whenever the extreme acceleration is not intended by the operator.

Figure 2:
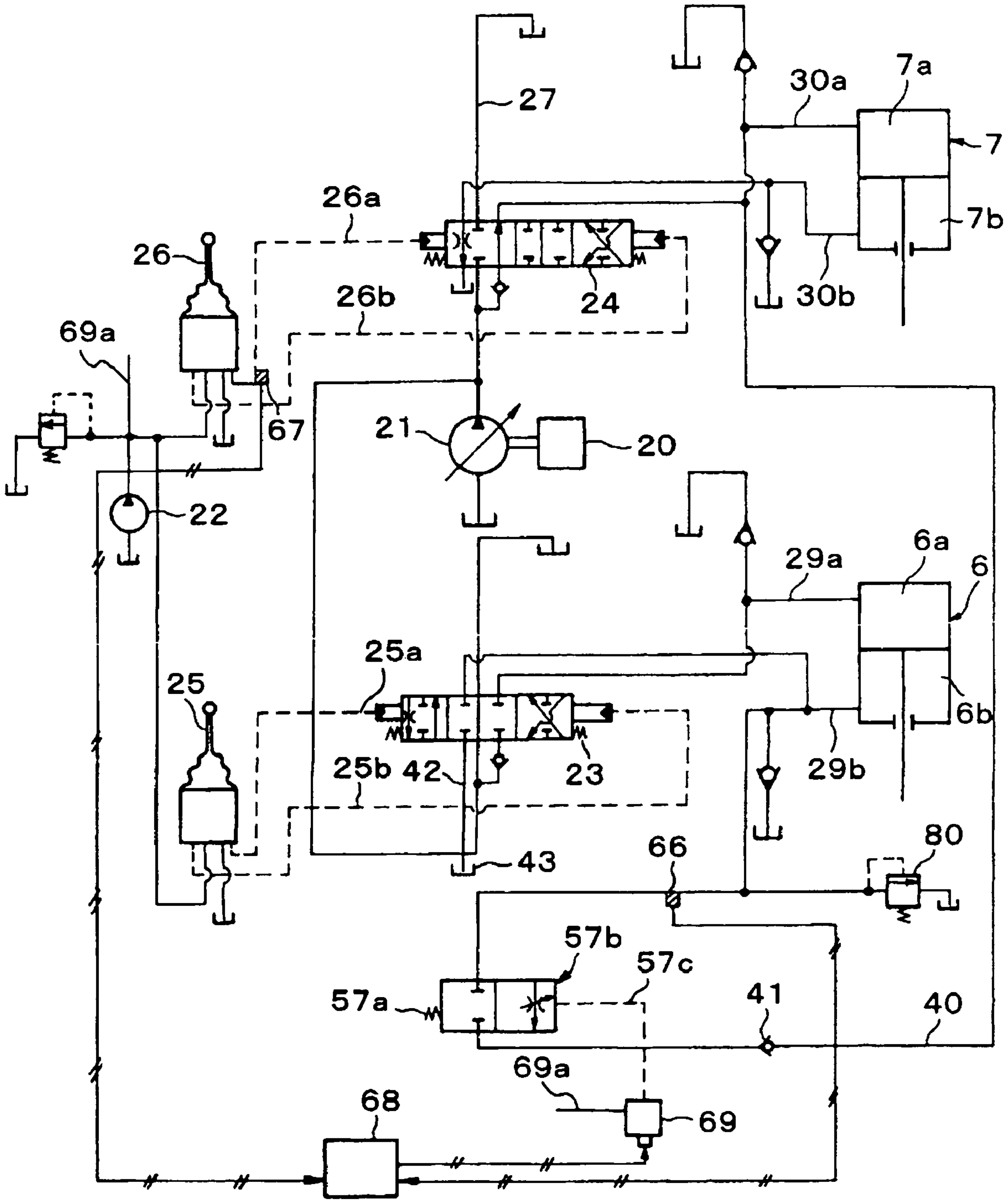
FIG. 2 is a hydraulic circuit illustrating a second embodiment of the present invention.

A description will next be made about the second embodiment of the present invention with reference to FIGS. 2 and 3. FIG. 2 is a hydraulic circuit diagram showing the second embodiment, while FIG. 3 is a block diagram illustrating the details of processing by the controller 68 arranged in the second embodiment.

As shown in FIG. 2, the second embodiment is constructed such that a switching valve 57*b* for holding the communication line 40 in a communicating state when the pressure in the rod chamber 6*b* of the boom cylinder as the first hydraulic cylinder has risen to a high-pressure of at least the predetermined pressure includes a variable restriction element and the variable restrictor 54 arranged in the first embodiment has been omitted. By a control pressure from a solenoid valve 69 to which a pilot pressure is fed via a control line 69*a*, the switching valve 57*b* is controlled in its valve position so that its valve opening area (the degree of restriction) is controlled. Also arranged are manipulation amount detection means for detecting a pressure of the pilot line 26*a* to determine the amount of an arm-crowding manipulation of the arm control device 26, for example, a pilot pressure detector 67; and pressure detection means for detecting the pressure in the rod chamber 6*b* of the boom cylinder 6, for example, a rod pressure detector 66. Also arranged in association with these means is a controller 68, which is inputted with signals from the pilot pressure detector 67 and rod pressure detector 66, performs predetermined processing, and outputs a drive current to the solenoid valve 69. The remaining construction is similar to the corresponding construction in the first embodiment.

Figure 3:
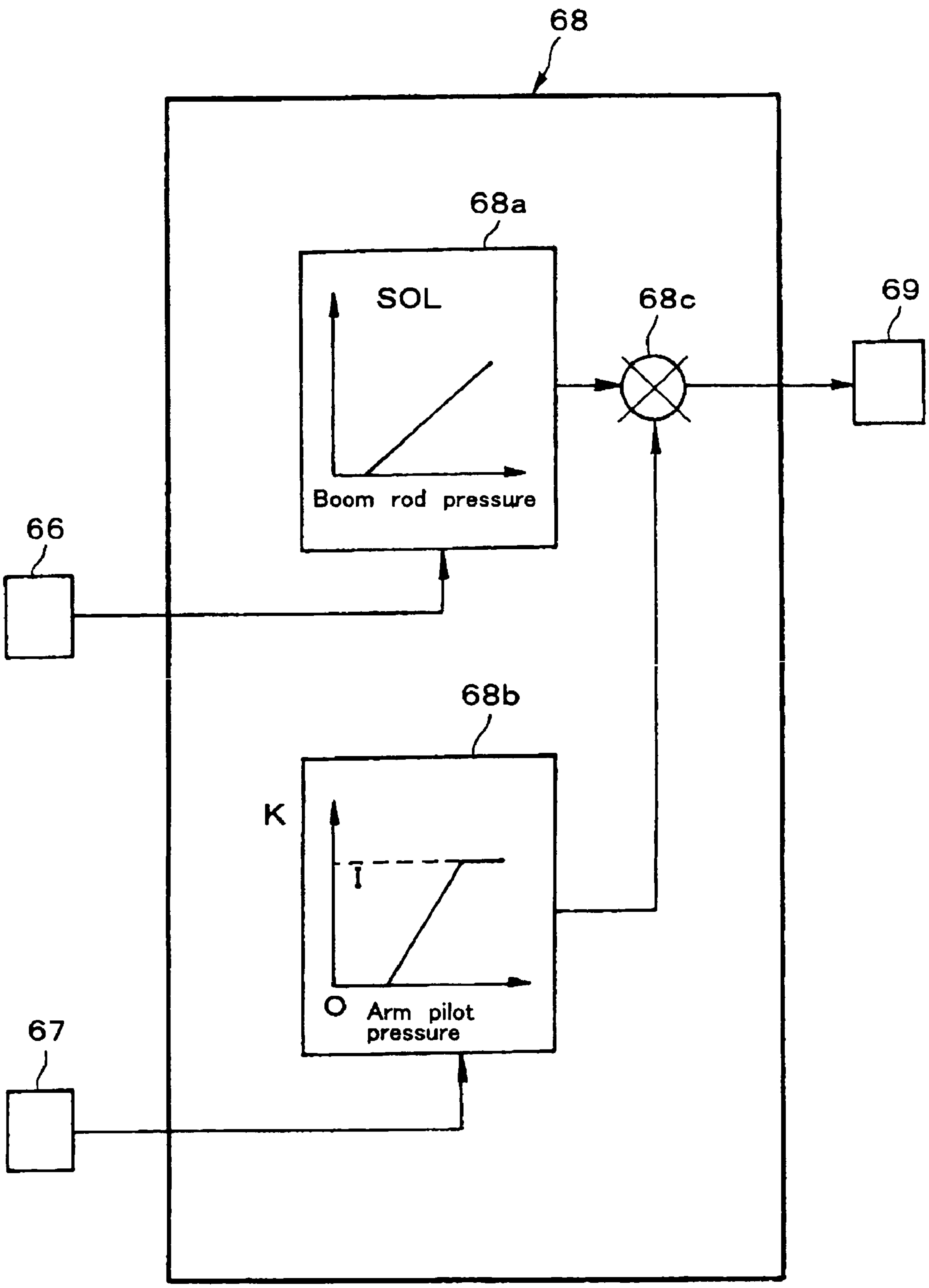
FIG. 3 is a block diagram depicting the details of processing by a controller arranged in the second embodiment.

According to the second embodiment constructed as described above, the amount of an arm-crowding manipulation of the arm control device 26 as detected by the pilot pressure detector 67 and the pressure in the rod chamber 6*b* of the boom cylinder 6 as detected by the rod pressure detector 66 are inputted to the controller 68, and at the controller 68, the processing illustrated in FIG. 3 is performed.

As illustrated in FIG. 3, the controller 68 is provided with a function generator 68*a* which, when the pressure in the rod chamber 6*b* of the boom cylinder 6 becomes higher than a predetermined pressure, outputs a large value responsive to this signal. The controller 68 is also provided with an other function generator 68*b* and a multiplier 68*c*. The function generator 68*b* outputs a large value not greater than 1 as a limit when the amount of an arm-crowding manipulation becomes greater than a predetermined amount, and the multiplier 68*c* multiplies signals outputted from the function generators 68*a*,68*b*, respectively. The product of the multiplication by the multiplier 68*c* is outputted as a drive signal (current) for the solenoid valve 69.

With the amount of an arm-crowding manipulation of the arm control device 26 and also with pressure in the rod chamber 6*b* of the boom cylinder 6, the drive signal to the solenoid valve 69 therefore becomes greater, and as a result, the hydraulic control force applied from the solenoid valve 6 to the switching valve 57*b* also becomes greater and the opening area of the switching valve 57*b* also becomes greater. As a consequence, the amount of the pressure oil fed from the rod chamber 6*b* of the boom cylinder 6 to the bottom chamber 7*a* of the arm cylinder 7 also becomes greater.

Similar to the above-mentioned first embodiment, when the pressure in the rod chamber 6*b* of the boom cylinder 6 becomes higher than the predetermined pressure by a digging counterforce at the time of an arm-crowding single operation in the second embodiment, the pressure oil can, therefore, be fed from the rod chamber 6*b* of the boom cylinder 6 to the bottom chamber 7*a* of the arm cylinder 7. It is, therefore, possible to cause the boom cylinder 6 to extend, to release a digging counterforce by an arm-crowding operation, and hence to prevent lifting of the body. As the pressure oil flowed out of the rod chamber 6*b* of the boom cylinder 6 is fed to the bottom chamber 7*a* of the arm cylinder 7, it is also possible to realize an acceleration of the arm cylinder 6 in the extending direction and to make faster the speed of an arm-crowding operation. As can be appreciated from the foregoing, the pressure oil in the rod chamber 6*b* of the boom cylinder 6 can be effectively used although it has heretofore been drained simply to the reservoir. Further, the valve opening area of the switching valve 57*b* is controlled in accordance with the pressure in the rod chamber 6*b* of the boom cylinder 6 and the amount of an arm-crowding manipulation. It is, therefore, possible to control an extreme acceleration of the arm cylinder second 7 whenever the extreme acceleration is not intended by the operator. It is also possible to reduce a shock when the switching valve 57*b* is changed over from the shut-off state to the communicating state.

The embodiments have been described above by taking the arm cylinder 7 as the second hydraulic cylinder. The second hydraulic cylinder can, however, be the bucket cylinder 8 shown in FIG. 5. Such a modification is different from the case of the arm 4 only in that the pressure oil is fed from the rod chamber 6*b* of the boom cylinder 6 to the bottom chamber of the bucket cylinder 8 and the digging speed by the bucket 8 can be accelerated, and can bring about similar advantageous effects as the first and second embodiments.

In the each of the above-described embodiments, the present invention was applied to the hydraulic drive unit provided with the directional control valves of the center bypass type. However, the present invention is not limited to such hydraulic drive units, but can have such a construction as applied to hydraulic drive units each of which is provided with directional control valves of the closed center type.

The invention claimed is:

1. A hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from said main hydraulic pump to said first hydraulic cylinder, a second directional control valve for controlling a flow of pressure oil to be fed from said main hydraulic pump to said second hydraulic cylinder, a first control device for performing switching control of said first directional control valve, and a second control device for performing switching control of said second directional control valve, wherein:

said hydraulic drive unit is provided with a communication control system which brings said rod chamber of said first hydraulic cylinder and said bottom chamber of said second hydraulic cylinder into communication with each other when a pressure in said rod chamber of said first hydraulic cylinder has risen to a high pressure of at least a predetermined pressure.

2. A hydraulic drive unit according to claim 1, wherein said communication control system comprises a communication line capable of bringing said rod chamber of said first hydraulic cylinder and said bottom chamber of said second hydraulic cylinder into communication with each other, a reverse-flow prevention device arranged on said communication line to inhibit pressure oil from flowing from said bottom chamber of said second hydraulic cylinder toward said rod chamber of said first hydraulic cylinder, and a switching valve for shutting off said communication line when said pressure in said rod chamber of said first hydraulic cylinder is lower than said predetermined pressure but maintaining said communication line in a communicating state when said pressure in said rod chamber of said first hydraulic cylinder has risen to at least said predetermined pressure.

3. A hydraulic drive unit according to claim 2, wherein said switching valve includes a variable restriction element a degree of restriction of which varies in accordance with said pressure in said rod chamber of said hydraulic cylinder.

4. A hydraulic drive unit according to claim 2, further comprising a variable restriction device, a degree of restriction of which varies in accordance with an amount of a manipulation of said second control device, on said communication line via which said bottom chamber of said second hydraulic cylinder and said reverse-flow prevention device are connected with each other.

5. A hydraulic drive unit according to claim 2, further comprising a solenoid valve for producing a pilot hydraulic pressure signal to control a valve position of said switching valve, a pressure detection device which detects said pressure in said rod chamber of said first hydraulic cylinder, a manipulation amount detector which detects an amount of a manipulation of said second control device, and a controller for being inputted with a pressure signal from said pressure detection device and a control signal from said manipulation amount detector, performing predetermined processing, and outputting a drive signal to said solenoid valve.

6. A hydraulic drive unit according to any one of claims 1–5, wherein said construction machine is a hydraulic excavator having a revolving upperstructure, a boom pivotally mounted on said revolving upperstructure and an arm pivotally mounted on said boom, said first hydraulic cylinder is a boom cylinder for driving said boom, and said second hydraulic cylinder is an arm cylinder for driving said arm, and said hydraulic drive unit comprises said communication control system for bringing a rod chamber of said boom cylinder and a bottom chamber of said arm cylinder into communication with each other when a pressure in said rod chamber of said boom cylinder has risen to said high pressure of at least said predetermined pressure.

7. A hydraulic drive unit according to any one of claims 1–5, wherein said construction machine is a hydraulic excavator having a revolving upperstructure, a boom pivotally mounted on said revolving upperstructure, an arm pivotally mounted on said boom and a bucket pivotally mounted on said arm, said first hydraulic cylinder is a boom cylinder for driving said boom, and said second hydraulic cylinder is a bucket cylinder for driving said bucket, and said hydraulic drive unit comprises said communication control system for bringing a rod chamber of said boom cylinder and a bottom chamber of said bucket cylinder into communication with each other when a pressure in said rod chamber of said boom cylinder has risen to said high pressure of at least said predetermined pressure.

8. A hydraulic drive unit according to claim 3, further comprising a solenoid valve for producing a pilot hydraulic pressure signal to control a valve position of said switching valve, a pressure detection device which detects said pressure in said rod chamber of said first hydraulic cylinder, a manipulation amount detector which detects an amount of a manipulation of said second control device, and a controller for being inputted with a pressure signal from said pressure detection device and a control signal from said manipulation amount detector, performing predetermined processing, and outputting a drive signal to said solenoid valve.

9. A hydraulic drive unit according to claim 8, wherein said construction machine is a hydraulic excavator having a revolving upperstructure, a boom pivotally mounted on said revolving upperstructure and an arm pivotally mounted on said boom, said first hydraulic cylinder is a boom cylinder for driving said boom, and said second hydraulic cylinder is an arm cylinder for driving said arm, and said hydraulic drive unit comprises said communication control system for bringing a rod chamber of said boom cylinder and a bottom chamber of said arm cylinder into communication with each other when a pressure in said rod chamber of said boom cylinder has risen to said high pressure of at least said predetermined pressure.

10. A hydraulic drive unit according to claim 8, wherein said construction machine is a hydraulic excavator having a revolving upperstructure, a boom pivotally mounted on said revolving upperstructure, an arm pivotally mounted on said boom and a bucket pivotally mounted on said arm, said first hydraulic cylinder is a boom cylinder for driving said boom, and said second hydraulic cylinder is a bucket cylinder for driving said bucket, and said hydraulic drive unit comprises said communication control system for bringing a rod chamber of said boom cylinder and a bottom chamber of said bucket cylinder into communication with each other when a pressure in said rod chamber of said boom cylinder has risen to said high pressure of at least said predetermined pressure.

11. A hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from said main hydraulic pump to said first hydraulic cylinder, a second directional control valve for controlling a flow of pressure oil to be fed from said main hydraulic pump to said second hydraulic cylinder, a first control device for performing switching control of said first directional control valve, and a second control device for performing switching control of said second directional control valve, wherein:

said hydraulic drive unit is provided with a communication control system which brings said rod chamber of said first hydraulic cylinder and said bottom chamber of said second hydraulic cylinder into communication with each other to combine pressure oil on a side of said rod chamber of said first hydraulic cylinder with pressure oil, which has been delivered from said main hydraulic pump and is to be fed to said bottom chamber of said second hydraulic cylinder via said second directional control valve, when a pressure in said rod chamber of said first hydraulic cylinder has risen to a high pressure of at least a predetermined pressure;

said communication control system comprises a communication line capable of bringing said rod chamber of said first hydraulic cylinder and said bottom chamber of said second hydraulic cylinder into communication with each other, a reverse-flow prevention device arranged on said communication line to inhibit pressure oil from flowing from said bottom chamber of said second hydraulic cylinder toward said rod chamber of said first hydraulic cylinder, and a switching valve for shutting off said communication line when said pressure in said rod chamber of said first hydraulic cylinder is lower than said predetermined pressure but maintaining said communication line in a communicating state when said pressure in said rod chamber of said first hydraulic cylinder has risen to at least said predetermined pressure; and further comprising a variable restriction device, a degree of restriction of which varies in accordance with an amount of a manipulation of said second control device, on said communication line via which said bottom chamber of said second hydraulic cylinder and said reverse-flow prevention device are connected with each other.

12. A hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from said main hydraulic pump to said first hydraulic cylinder, a second directional control valve for controlling a flow of pressure oil to be fed from said main hydraulic pump to said second hydraulic cylinder, a first control device for performing switching control of said first directional control valve, and a second control device for performing switching control of said second directional control valve, wherein:

said hydraulic drive unit is provided with a communication control system which brings said rod chamber of said first hydraulic cylinder and said bottom chamber of said second hydraulic cylinder into communication with each other to combine pressure oil on a side of said rod chamber of said first hydraulic cylinder with pressure oil, which has been delivered from said main hydraulic pump and is to be fed to said bottom chamber of said second hydraulic cylinder via said second directional control valve, when a pressure in said rod chamber of said first hydraulic cylinder has risen to a high pressure of at least a predetermined pressure;

said communication control system comprises a communication line capable of bringing said rod chamber of said first hydraulic cylinder and said bottom chamber of said second hydraulic cylinder into communication with each other, a reverse-flow prevention device arranged on said communication line to inhibit pressure oil from flowing from said bottom chamber of said second hydraulic cylinder toward said rod chamber of said first hydraulic cylinder, and a switching valve for shutting off said communication line when said pressure in said rod chamber of said first hydraulic cylinder is lower than said predetermined pressure but maintaining said communication line in a communicating state when said pressure in said rod chamber of said first hydraulic cylinder has risen to at least said predetermined pressure; and further comprising a solenoid valve for producing a pilot hydraulic pressure signal to control a valve position of said switching valve, a pressure detection device which detects said pressure in said rod chamber of said first hydraulic cylinder, a manipulation amount detector which detects an amount of a manipulation of said second control device, and a controller for being inputted with a pressure signal from said pressure detection device and a control signal from said manipulation amount detector, performing predetermined processing, and outputting a drive signal to said solenoid valve.

13. A hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from said main hydraulic pump to said first hydraulic cylinder, a second directional control valve for controlling a flow of pressure oil to be fed from said main hydraulic pump to said second hydraulic cylinder, a first control device for performing switching control of said first directional control valve, and a second control device for performing switching control of said second directional control valve, wherein:

said hydraulic drive unit is provided with a communication control system which brings said rod chamber of said first hydraulic cylinder and said bottom chamber of said second hydraulic cylinder into communication with each other to combine pressure oil on a side of said rod chamber of said first hydraulic cylinder with pressure oil, which has been delivered from said main hydraulic pump and is to be fed to said bottom chamber of said second hydraulic cylinder via said second directional control valve, when a pressure in said rod chamber of said first hydraulic cylinder has risen to a high pressure of at least a predetermined pressure;

said communication control system comprises a communication line capable of bringing said rod chamber of said first hydraulic cylinder and said bottom chamber of said second hydraulic cylinder into communication with each other, a reverse-flow prevention device arranged on said communication line to inhibit pressure oil from flowing from said bottom chamber of said second hydraulic cylinder toward said rod chamber of said first hydraulic cylinder, and a switching valve for shutting off said communication line when said pressure in said rod chamber of said first hydraulic cylinder is lower than said predetermined pressure but maintaining said communication line in a communicating state when said pressure in said rod chamber of said first hydraulic cylinder has risen to at least said predetermined pressure;

said switching valve includes a variable restriction element a degree of restriction of which varies in accordance with said pressure in said rod chamber of said hydraulic cylinder; and further comprising a solenoid valve for producing a pilot hydraulic pressure signal to control a valve position of said switching valve, a pressure detection device which detects said pressure in said rod chamber of said first hydraulic cylinder, a manipulation amount detector which detects an amount of a manipulation of said second control device, and a controller for being inputted with a pressure signal from said pressure detection device and a control signal from said manipulation amount detector, performing predetermined processing, and outputting a drive signal to said solenoid valve.

14. A hydraulic drive unit according to any one of claims 11–13, wherein said construction machine is a hydraulic excavator having a revolving upperstructure, a boom pivotally mounted on said revolving upperstructure and an arm pivotally mounted on said boom, said first hydraulic cylinder is a boom cylinder for driving said boom, and said second hydraulic cylinder is an arm cylinder for driving said arm, and said hydraulic drive unit comprises said communication control system for bringing a rod chamber of said boom cylinder and a bottom chamber of said arm cylinder into communication with each other when a pressure in said rod chamber of said boom cylinder has risen to said high pressure of at least said predetermined pressure.

15. A hydraulic drive unit according to any one of claims 11–13, wherein said construction machine is a hydraulic excavator having a revolving upperstructure, a boom pivotally mounted on said revolving upperstructure, an arm pivotally mounted on said boom and a bucket pivotally mounted on said arm, said first hydraulic cylinder is a boom cylinder for driving said boom, and said second hydraulic cylinder is a bucket cylinder for driving said bucket, and said hydraulic drive unit comprises said communication control system for bringing a rod chamber of said boom cylinder and a bottom chamber of said bucket cylinder into communication with each other when a pressure in said rod chamber of said boom cylinder has risen to said high pressure of at least said predetermined pressure.

16. A hydraulic drive unit arranged on a construction machine and provided with a main hydraulic pump, a first hydraulic cylinder and second hydraulic cylinder each of which has a rod chamber and a bottom chamber, a first directional control valve for controlling a flow of pressure oil to be fed from said main hydraulic pump to said first hydraulic cylinder, a second directional control valve for controlling a flow of pressure oil to be fed from said main hydraulic pump to said second hydraulic cylinder, a first control device for performing switching control of said first directional control valve, and a second control device for performing switching control of said second directional control valve, wherein:

said hydraulic drive unit is provided with a communication control system which brings said rod chamber of said first hydraulic cylinder and said bottom chamber of said second hydraulic cylinder into communication with each other to combine pressure oil on a side of said rod chamber of said first hydraulic cylinder with pressure oil, which has been delivered from said main hydraulic pump and is to be fed to said bottom chamber of said second hydraulic cylinder via said second directional control valve, when a pressure in said rod chamber of said first hydraulic cylinder has risen to a high pressure of at least a predetermined pressure.

* * * * *